United States Patent [19]

Futamoto et al.

[11] Patent Number: 4,707,756
[45] Date of Patent: Nov. 17, 1987

[54] PERPENDICULAR MAGNETIC RECORDING MEDIUM

[75] Inventors: Masaaki Futamoto, Tsukui; Yukio Honda, Fuchu; Yasutaro Uesaka, Kokubunji; Kazuetsu Yoshida, Kodaira, all of Japan

[73] Assignees: Hitachi, Ltd., Tokyo; Hitachi Maxell Ltd., Osaka, both of Japan

[21] Appl. No.: 721,715

[22] Filed: Apr. 10, 1985

[30] Foreign Application Priority Data

Apr. 11, 1984 [JP] Japan ................................. 59-70888

[51] Int. Cl.⁴ ........................................... G11B 15/00
[52] U.S. Cl. .................................. 360/131; 360/134; 360/135; 360/136; 428/641; 428/611; 428/900; 428/694; 427/128; 427/131
[58] Field of Search ...................... 360/131, 134–136; 427/128, 131; 428/694, 900, 641, 928, 668, 611

[56] References Cited

U.S. PATENT DOCUMENTS

| | | | |
|---|---|---|---|
| 4,542,062 | 9/1985 | Takada et al. | 428/900 |
| 4,576,876 | 3/1986 | Shiiki et al. | 360/131 |

FOREIGN PATENT DOCUMENTS

| | | |
|---|---|---|
| 0048414 | 3/1982 | European Pat. Off. . |
| 0152269 | 8/1985 | European Pat. Off. . |
| 5634143 | 8/1979 | Japan ................................. 427/131 |
| 54-145505 | 11/1979 | Japan ................................. 360/131 |
| 55-163630 | 12/1980 | Japan ................................. 360/131 |
| 57-24022 | 2/1982 | Japan ................................. 360/131 |

OTHER PUBLICATIONS

Patents Abstracts of Japan, vol. 7, No. 17, Jan. 22, 1983, 57-173917, 10-26-82.

Primary Examiner—John H. Wolff
Assistant Examiner—Matthew J. Bussan
Attorney, Agent, or Firm—Antonelli, Terry & Wands

[57] ABSTRACT

Disclosed is a perpendicular magnetic recording medium wherein an underlayer made of a material containing Si and/or Ge as its principal ingredient is deposited on a substrate, and a perpendicular magnetic film made of a Co-based alloy is deposited on the underlayer. With the perpendicular magnetic recording medium, the perpendicular magnetic film has an enhanced degree of C-axis orientation, and the bond strength between the perpendicular magnetic film and the substrate is also enhanced when the substrate is non-metallic.

19 Claims, 2 Drawing Figures

PERPENDICULAR MAGNETIC RECORDING MEDIUM

BACKGROUND OF THE INVENTION

The present invention relates to a magnetic recording medium suited for a perpendicular magnetic recording system.

The perpendicular magnetic recording system performs recording in a direction perpendicular to the plane of a recording medium film, and it is a system which is suitable for enhancing a recording density because a demagnetizing field within each bit in the case of high density recording is low. As magnetic recording media which are used for this purpose, there are Co-based alloy films such as Co-Cr, Co-V, Co-Mo, Co-W, Co-Re, Co-O, Co-Cr-Rh, Co-Cr-Ru and Co-Ni-O films. Any of these Co-based alloys has a hexagonal close-packed (h.c.p.) crystal structure, and possesses the merit that fine crystal grains constituting the thin film are liable to C-axis orientation. In order to enhance magnetic recording characteristics, the degree of C-axis orientation of the thin film needs to be raised.

The perpendicular magnetic recording media presently in use are such that the Co-based alloy film is adhered to a non-magnetic substrate directly or through a soft magnetic thin film of permalloy (an Ni-Fe alloy whose principal ingredient is Ni and which exhibits a high magnetic permeability) or the like. A plastics film of polyimide, polyethylene terephthalate or the like, an Al or glass plate, etc. are employed as the non-magnetic substrates. In case of forming the Co-based alloy film on such a substrate, this Co-based alloy film must have a good adhesion with the substrate and a high degree of C-axis orientation. However, in a case where the Co-based alloy film is directly adhered to the plastics film or the glass plate by an evaporation method, there are the problems that the bond strength is insufficient, so the Co-based alloy film is prone to peel off from the substrate, and that the property of C-axis orientation has variation due to a subtle difference in the cleanness of the substrate surface. Besides, in a case where the Co-based alloy film is stuck on the metal substrate of Al or the like or on the soft magnetic metal film of permalloy or the like, the crystal orientation of the grains of the underlying metal exerts an adverse effect on the degree of C-axis orientation of the Co-based alloy which is to be adhered to the metal. For example, the materials Al and permalloy have face centered cubic (f.c.c.) crystal structures, and it is known that as the (111) plane of the f.c.c. structure is more parallel to the plane of the substrate, the degree of C-axis orientation of the Co-based alloy to be adhered thereon is better. Since, however, the parallelism of the (111) plane of the actual substrate or soft magnetic metal thin film to the substrate plane is not very good, there is the problem that the degree of C-axis orientation of the Co-based alloy becomes worse than in the case of adhering the alloy film to the plastics or glass substrate. Further, as disclosed in the official gazette of Japanese Patent Application Laying-open No. 56-70618, the degree of C-axis orientation of a Co-Cr alloy film is improved when the Co-Cr alloy film is formed on a substrate which is so prepared that the C axis of a substance having the crystal structure of hexagonal close-packed lattice is oriented perpendicularly to the surface of the substrate. Since, however, the crystal orientation of the underlying substance of the h.c.p. structure is also problematic in this case, the characteristics of the Co-based alloy are governed unfavorably by the property of crystal orientation of the underlying film.

The following references are cited to show the state of the art; (i) Official Gazette of Japanese Patent Application Laying-open No. 56-70618, and (ii) Official Gazette of Japanese Patent Application Publication No. 58-91.

SUMMARY OF THE INVENTION

An object of the present invention is to eliminate the difficulties of the prior art, and to provide a perpendicular magnetic recording medium according to which, in case of employing a non-metallic substrate of plastics, glass or the like, the bond strength thereof with a Co-based alloy film to be adhered thereon is enhanced and besides enhancement in the degree of C-axis orientation of the Co-based alloy film is permitted, and in case of adhering a Co-based alloy film on a metal substrate of Al or the like or on a soft magnetic metal film, the degree of C-axis orientation of the alloy film is improved.

In order to accomplish the object, the perpendicular magnetic recording medium of the present invention comprises a substrate, an underlayer which is made of a material containing as its principal ingredient at least one element selected from the group consisting of Si and Ge and which is deposited on said substrate, and a perpendicular magnetic film (namely, a film with perpendicular magnetic anisotropy) which is made of a Co-based alloy and which is deposited on said underlayer.

The inventor's experiments have revealed that in a case where before underlayer a Co-based alloy, an underlayer of a thin film made of Si or Ge being a metalloid or an alloy thereof, is formed on a substrate, followed by the adhering of the Co-based alloy film, a film having a favorable property of C-axis orientation is produced with good reproducibility. The degree of C-axis orientation of the Co-based alloy in the case of adhering the thin film of Si, Ge or the alloy thereof exhibited a tendency to have a substantially constant good value irrespective of the kind of the substrate. This tendency was noted with any of the evaporation method, a sputtering method and an ion-beam sputtering method. Accordingly, any of the film depositing methods mentioned above can be used for forming the underlayer and the Co-based alloy film. It has also been revealed that, when a Co-based alloy is adhered to a substrate of a non-metallic material such as plastics or glass, and a layer of Si, Ge or an alloy thereof is formed between them, an enhanced bond strength which is effective to prevent the exfoliation of the Co-based alloy film or the cracking thereof is thereby attained. The deposition of the under layer of Si or the like and that of the Co-based alloy film should desirably be continuously performed within an identical vacuum apparatus. When the underlayer is deposited and then exposed to the air, its surface is oxidized or contaminated, so that the degree of C-axis orientation of the Co-based alloy film worsens.

The underlayer film in the present invention, the principal ingredient of which is Si and/or GE, forms a new substrate surface for forming the Co-based alloy film and possesses properties desirable for obtaining the film of good C-axis orientation. The provision of such underlayer is very effective for forming the Co-based alloy film of good C-axis orientation reproducibility on any of almost all substrate materials such as plastics, glass, Al and permalloy.

When the thickness of the underlayer of any of the aforementioned materials is less than 100 Å, the elimination of the influence of the substrate material is insufficient, and hence, the thickness needs to be at least 100 Å. Even when the thickness of the underlayer is as great as 1 μm or above, the effects stated above hold similarly, and, however, in such a case, a period of time for forming the film becomes long or the film formed on the plastics material is liable to crack. Accordingly, the thickness of the layer is desired to be from at least 100 Å to at most 1 μm, and the range of the thickness more desirable in practical use is from at least 150 Å to at most 1000 Å.

The material which constructs the underlayer to be interposed between the substrate and the perpendicular magnetic layer is any of Si, Ge, and an Si-Ge alloy (the composition ratio of which is not especially restricted), and one or more other elements may well be further added to it by employing it as the principal ingredient.

In the case of adding any element other than Si and Ge, the quantity of addition thereof shall be within a range in which the crystal structure of the underlayer formed maintains a diamond structure, an amorphous structure or the mixed structure thereof. When the addition of the other element in an amount exceeding this range results in the under-layer crystal structure which contains any structure other than the diamond structure and the amorphous structure, the effects of the present invention unfavorably lower. The permissible quantity of addition differs depending upon elements, in such a manner that it is 10 at.% or less for many elements, but that it is as large as 40 at.% or more for some elements including Sn. The addition of the other element makes it possible to improve, for example, adhesion and corrosion resistance.

Further, as the Co-based alloys of the perpendicular magnetic films, all those employed for perpendicular magnetic recording can be used in the present invention. Especially Co-Cr alloys stated, for example, in the official gazette of Japanese Patent Application Publication No. 58-91 are common, and Co alloys each containing V, Mo, W, Re, O, Cr-Rh, Cr-Ru, or Ni-O are also known.

It has been known that a magnetic recording medium wherein a substrate, at least one surface of which is made of a soft magnetic material such as permalloy, is provided with a perpendicular magnetic film of a Co-based alloy on the soft magnetic material surface is advantageous for enhancing recording and reproducing characteristics. The present invention is also applicable to such a case. In such a case, the underlayer, whose principal ingredient is Si and/or Ge, is deposited on the soft magnetic material surface, and the perpendicular magnetic film is deposited on the underlayer.

BRIEF DESCRIPTION OF THE DRAWINGS

FIG. 1 is a sectional view showing a perpendicular magnetic recording medium in an embodiment of the present invention, while

DESCRIPTION OF THE PREFERRED EMBODIMENTS

Example 1

Figure 1:
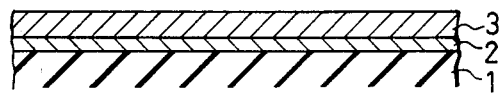

Using a polyimide film as a substrate, films of a structure shown in FIG. 1 were produced by the following steps. While a substrate 1 made of a polyimide film was heated to 150° C. in a vacuum of $1 \times 10^{-6}$ Torr, Si was first vacuum-evaporated as an underlayer material to a thickness of 300 Å at a rate of 10 Å/sec., to form an underlayer 2. Subsequently, in the same vacuum vessel as used for the above step, Co-22 wt.% Cr was vacuum-evaporated to a thickness of 5000 Å at a rate of 80 Å/sec. into a Co-based alloy film 3 whereby a perpendicular magnetic recording medium having the structure shown in FIG. 1 was fabricated.

Thenceforth, films of the structure shown in FIG. 1 were produced by employing Ge, Si-10wt.% Ge, Si-2 wt.% Ti, and Ge-1 wt.% Ti as underlayer materials respectively, under similar conditions.

As a comparative sample, there was produced one in which a Co-22 wt.% Cr film was deposited to a thickness of 5000 Å at a rate of 80 Å/sec. directly on a polyimide film held at a substrate temperature of 150° C.

Table 1 illustrates by comparison the degrees of C-axis orientation and the situations of cracking of the respective Co-Cr films. The degree of C-axis orientation was estimated by the half width of the rocking curve, $\Delta\theta_{50}$ (in degree) of an X-ray diffraction line based on the (0002) plane of the h.c.p. phase of the Co-Cr alloy. As the value of $\Delta\theta_{50}$ is smaller, the degree of C-axis orientation of Co-Cr is higher. In Table 1 and Tables 2 and 3 described hereinafter, a mark o indicates a case where cracking was not noted in the Co-Cr film at all, whereas a mark x indicates a case where cracking existed even if slightly.

TABLE 1

| Characteristics | Underlayer |  |  |  |  |  |
|---|---|---|---|---|---|---|
|  | None | Si 300Å | Ge 300Å | Si-10 wt % Ge 300Å | Si-2 wt % Ti 300Å | Ge-1 wt % Ti 300Å |
| Degree of Orientation $\Delta\theta_{50}$ (degrees) | 7.3 | 4.8 | 5.1 | 4.9 | 5.0 | 5.2 |
| State of Film | x | o | o | o | o | o |

As apparent from Table 1, in the case of providing the underlayer, the value of $\Delta\theta_{50}$ was improved over that in the case of providing no underlayer, and the Co-Cr film of good quality free from the appearance of cracks were obtained. Regarding magnetic characteristics, all the samples exhibited the perpendicular magnetic anisotropy and were perpendicular magnetic films.

The underlayers were recognized to be amorphous by X-ray diffraction.

Example 2

Figure 2:
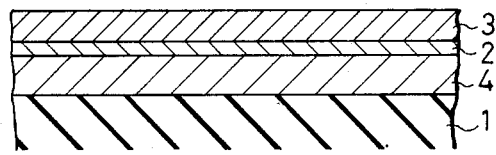
FIG. 2 is a sectional view showing a perpendicular magnetic recording medium in another embodiment of the present invention.

Using a polyimide film as a substrate, films of a structure shown in FIG. 2 were produced by the following steps. While a substrate 1 made of a polyimide film was heated to 170° C. in a vacuum of $3 \times 10^{-6}$ Torr, permalloy (Ni-20 wt.% Fe) being a soft magnetic material was first evaporated to a thickness of 4000 Å at a rate of 50 Å/sec. into a soft magnetic material film 4. Subsequently, in the same vacuum vessel as used for the above step, Si was evaporated as an underlayer material to a thickness of 500 Å at a rate of 15 Å/sec., to form an underlayer 2. Further, Co-25 wt.% Cr was evaporated to a thickness of 2000 Å at a rate of 100 Å/sec. into a Co-based alloy film 3 whereby the films of the structure shown in FIG. 2 were fabricated.

Thenceforth, films of the structure shown in FIG. 2 were produced by employing Ge, Si-25 wt.% Ge, Si-0.5 wt.% Ti, and Ge-0.7 wt.% Zr as underlayer materials respectively, under similar conditions.

As a comparative sample, there was produced one in which permalloy was evaporated to a thickness of 4000 Å at a rate of 50 Å/sec. on a polyimide film held at a substrate temperature of 170° C. and which had Co-25 wt.% Cr subsequently evaporated thereon to a thickness of 2000 Å at a rate of 100 Å/sec.

Table 2 lists by comparison the characteristics of the respective Co-Cr films. The estimations of the characteristics were conducted similarly to those in Example 1. Owing to the provison of the underlayers, the Co-Cr films having high degrees of C-axis orientation and exhibiting the perpendicular magnetic anisotropy could be produced.

The underlayers were recognized to be amorphous by X-ray diffraction.

TABLE 2

| Character-istics | Underlayer | | | | | |
|---|---|---|---|---|---|---|
| | None | Si 500Å | Ge 500Å | Si-25 wt % Ge 500Å | Si-0.5 wt % Ti 500Å | Ge-0.7 wt % Zr 500Å |
| Degree of Orientation $\Delta\theta_{50}$ (degrees) | 13.3 | 5.1 | 5.0 | 4.8 | 5.2 | 5.1 |
| State of Film | o | o | o | o | o | o |

Example 3

The polyimide film in Example 2 was replaced with a polyethylene terephthalate film, and the film temperature was held at 110° C. Thus, similar samples were produced. When the $\Delta\theta_{50}$ values were measured, the value was $\Delta\theta_{50}=14$ degrees in the case of providing no underlayer, whereas the values fell within a range of $\Delta\theta_{50}=4$ to 6 degrees and the Co-Cr films of good C-axis orientation were obtained in all the cases of providing the underlayers.

The underlayers were recognized to be amorphous by X-ray diffraction.

Example 4

Using Al for a substrate 1, films of the structure shown in FIG. 2 were produced by the sputtering method in accordance with the following steps. By employing a radio-frequency sputtering apparatus, Fe-6 wt.% Al-10 wt.% Si being a soft magnetic material was first deposited on the substrate 1 to a thickness of 5000 Å under the conditions of an Ar pressure of 5 mTorr and a sputtering radio-frequency power of 4 W/cm². Subsequently, Si was deposited as an underlayer 2 to a thickness of 600 Å under the conditions of an Ar pressure of 3 mTorr and a sputtering radio-frequency power of 2 W/cm². Further, Co-18 wt.% Cr was deposited to a thickness of 3500 Å under an Ar pressure of 3 mTorr and a radio-frequency power of 8 W/cm². Then, the films having the structure shown in FIG. 2 were fabricated.

Thenceforth, films of the same structure were produced by employing Ge, Si-80 wt.% Ge, Si-0.3 wt.% Ti, and Ge-0.1 wt.% B as underlayer materials respectively, under similar conditions.

As a comparative material, a film structure with the underlayer omitted was produced under similar conditions. In table 3, the characteristics of the respective Co-Cr films are listed by comparison. Owing to the provision of the underlayers, the Co-Cr films having high degrees of C-axis orientation and exhibiting perpendicular magnetic anisotropy could be produced.

The underlayers were recognized to be amorphous by X-ray diffraction.

TABLE 3

| Character-istics | Underlayer | | | | | |
|---|---|---|---|---|---|---|
| | None | Si 600Å | Ge 600Å | Si-80 wt % Ge 600Å | Si-0.3 wt % Ti 600Å | Ge-0.1 wt % B 600Å |
| Degree of Orientation $\Delta\theta_{50}$ (degrees) | 18 | 3.8 | 4.2 | 4.0 | 3.9 | 3.9 |
| State of Film | o | o | o | o | o | o |

Example 5

A perpendicular magnetic recording medium was produced in the same way as in Example 1 (a substrate temperature of 150° C. was set for the deposition of the Co-Cr alloy) except that quartz glass was used for the substrate and that Si and Ge were used for the underlayer with the substrate temperature set at 400° C. during the deposition of the underlayer. When the degree of orientation and the situation of cracking of the Co-Cr alloy film were examined, they were similar to those in Example 1. The underlayer in this case was a very fine polycrystalline film (the grain size of Ge was not larger than about 2000 Å, and that of Si was not larger than about 800 Å).

In the above examples, the case of the Co-Cr alloy has been described as one example of the Co-based alloy. However, even when other Co-based alloys such as Co-V, Co-Mo, Co-O, Co-Cr-Rh and Co-Cr-Ru were used, the effect of enhancing the degrees of C-axis orientation owing to the provision of the underlayers was noted. Also in a case where different materials such as Fe-Si and Co-Nb-Zr alloys were employed for the soft magnetic material layers, equal effects were noted.

In the perpendicular magnetic recording medium of the present invention, matters not mentioned in this specification may be resorted to the knowledge of prior art in the technical field concerned.

As apparent from the description thus far made, when an under layer which is made of Si, Ge or an alloy thereof or an alloy with one or more elements further added to such principal ingredient is provided before the deposition of a Co-based alloy film, a perpendicular magnetic film formed of the Co alloy film of good C-axis orientation can be produced with good reproducibility irrespective of a substrate or an underlying soft magnetic material. Further, in a case where the substrate is of a non-metallic material, the bond strength between the substrate and the Co alloy film is enhanced.

Obviously many modifications and variations of the present invention are possible in the light of the above teachings. It is therefore to be understood that within the scope of the appended claims the invention may be practiced other than as specifically described.

What is claimed is:

1. A perpendicular magnetic recording medium comprising a substrate, an underlayer which is made of a material containing as its principal ingredient at least one element selected from the group consisting of Si and Ge and which is deposited on said substrate, and a perpendicular magnetic film which is made of a Co-based alloy and which is deposited on said underlayer.

2. A perpendicular magnetic recording medium according to claim 1, wherein a thickness of said underlayer is at least 100 Å and at most 1 μm.

3. A perpendicular magnetic recording medium according to claim 2, wherein a thickness of said underlayer is at least 150 Å and at most 1000 Å.

4. A perpendicular magnetic recording medium according to claim 1, wherein said underlayer is made of a material in which at least one element other than Si and Ge is added in such a range of amount that any structure other than a diamond structure and an amorphous structure does not appear in a crystal structure of said underlayer.

5. A perpendicular magnetic recording medium according to claim 2, wherein said underlayer is made of a material in which at least one element other than Si and Ge is added in such a range of amount that any structure other than a diamond structure and an amorphous structure does not appear in a crystal structure of said underlayer.

6. A perpendicular magnetic recording medium according to claim 3, wherein said underlayer is made of a material in which at least one element other than Si and Ge is added in such a range of amount that any structure other than a diamond structure and an amorphous structure does not appear in a crystal structure of said underlayer.

7. A perpendicular magnetic recording medium according to claim 1, wherein at least that surface of said substrate on which said underlayer is formed is made of a soft magnetic material.

8. A perpendicular magnetic recording medium according to claim 2, wherein at least that surface of said substrate on which said underlayer is formed is made of a soft magnetic material.

9. A perpendicular magnetic recording medium according to claim 3, wherein at least that surface of said substrate on which said underlayer is formed is made of a soft magnetic material.

10. A perpendicular magnetic recording medium according to claim 1, wherein said Co-based alloy is selected from the group consisting of Co-Cr, Co-V, Co-Mo, Co-O, Co-Cr-Rh and Co-Cr-Ru.

11. A perpendicular magnetic recording medium according to claim 1, wherein said Co-based alloy is a Co-Cr alloy.

12. A perpendicular magnetic recording medium according to claim 4, wherein said at least one element other than Si and Ge is selected from the group consisting of Ti, Zr and B.

13. A perpendicular magnetic recording medium according to claim 1, wherein said substrate is made of a material selected from the group consisting of polyimide, polyethylene terephthalate and quartz glass.

14. A perpendicular magnetic recording medium according to claim 11, wherein said underlayer consists of Ge.

15. A perpendicular magnetic recording medium comprising a substrate, an underlayer made of Ge deposited on said substrate, and a perpendicular magnetic film made of a Co-Cr alloy deposited on said underlayer.

16. A perpendicular magnetic recording medium according to claim 15, wherein a thickness of said underlayer is at least 100 Å and at most 1 μm.

17. A perpendicular magnetic recording medium according to claim 15, wherein a thickness of said underlayer is at least 150 Å and at most 1000 Å.

18. A perpendicular magnetic recording medium according to claim 15, wherein at least that surface of said substrate on which said underlayer is formed is made of a soft magnetic material.

19. A perpendicular magnetic recording medium according to claim 15, wherein said substrate is made of a material selected from the group consisting of polyimide, polyethylene terephthalate and quartz glass.

* * * * *